(12) United States Patent
Mattei et al.

(10) Patent No.: US 6,448,495 B1
(45) Date of Patent: Sep. 10, 2002

(54) FIBER OPTIC CABLE RACEWAY OUTLET WITH RACEWAY COVER, AND METHOD

(75) Inventors: Michael Mattei, Saint James; Robert P. Auteri, Manorville, both of NY (US)

(73) Assignee: Fiber Management Solutions, Inc., Holbrook, NY (US)

( * ) Notice: Subject to any disclaimer, the term of this patent is extended or adjusted under 35 U.S.C. 154(b) by 0 days.

(21) Appl. No.: 09/912,776

(22) Filed: Jul. 25, 2001

Related U.S. Application Data
(60) Provisional application No. 60/261,563, filed on Jan. 12, 2001.

(51) Int. Cl.[7] .................................................. H02G 3/04
(52) U.S. Cl. ........................ 174/48; 174/60; 174/68.1; 174/95; 52/220.7
(58) Field of Search ............................. 174/95, 48, 49, 174/68.1, 60, 64, 34, 97, 135, 706; 220/3.6, 3.7, 3.92; 52/220.1, 220.3, 220.5, 220.7 C

(56) References Cited

U.S. PATENT DOCUMENTS

| | | | |
|---|---|---|---|
| 5,013,112 A | | 5/1991 | Hellwig |
| 5,067,678 A | | 11/1991 | Henneberger et al. |
| 5,142,606 A | | 8/1992 | Carney et al. |
| 5,299,947 A | | 4/1994 | Barnard |
| 5,316,243 A | | 5/1994 | Henneberger |
| 5,316,244 A | | 5/1994 | Zetena, Jr. |
| 5,394,502 A | | 2/1995 | Caron |
| 5,402,515 A | | 3/1995 | Vidacovich et al. |
| 5,437,087 A | | 8/1995 | Gordon |
| 5,473,724 A | | 12/1995 | Board et al. |
| 5,530,787 A | | 6/1996 | Arnett |
| 5,614,695 A | * | 3/1997 | Benito Navazo ............. 174/48 |
| 5,683,211 A | | 11/1997 | Gordon |
| 5,792,993 A | | 8/1998 | Rinderer |
| 5,872,336 A | | 2/1999 | Long |
| 5,937,131 A | | 8/1999 | Haataja et al. |
| 5,942,724 A | * | 8/1999 | Russo et al. ................... 174/48 |
| 5,942,729 A | * | 8/1999 | Carlson, Jr. et al. ....... 174/68.1 |
| 6,012,683 A | | 1/2000 | Howell |
| 6,061,984 A | | 5/2000 | Rose |
| 6,192,181 B1 | | 2/2001 | Haataja et al. |
| 6,291,769 B1 | * | 9/2001 | Handler ......................... 174/66 |
| 6,316,725 B1 | * | 11/2001 | Cole et al. ..................... 174/48 |

FOREIGN PATENT DOCUMENTS

| EP | 0 957 553 A1 | 11/1999 |
|---|---|---|
| GB | 408463 | 4/1934 |

OTHER PUBLICATIONS

Cablofil, Inc.; New Products from EZTray; Cable Drop Out; Nov. 16, 2000; http://www.cablofil.com/pages/NPDropout.htm; St. Louis, Missouri; US.

Cooper B–Line, Inc.; B–Line Wire Basket Cable Support—Catalog Download; Nov. 16, 2000; http://www.b–line.com/product/WireBasket/wirebasketpdf.htm.

AT&T Network Systems; Facility Network Management System; Atlanta, Georgia; US No Date.

ADC Telecommunications, Inc.; Plenum FiberGuide Fiber Management System; Oct. 2000; 812; www.adc.com; Minneapolis, Minnesota; US.

* cited by examiner

Primary Examiner—Anthony Dinkins
Assistant Examiner—Dhiru R Patel
(74) Attorney, Agent, or Firm—Adams, Schwartz & Evans, P.A.

(57) ABSTRACT

A cable raceway outlet mountable to a cable raceway having a side wall terminating in a top edge. The raceway outlet comprises a transition assembly for being mounted over the top of the top edge of the raceway for supporting a cable passing between the raceway and a point outside the raceway, and a protective transition assembly cover for being positioned onto the transition assembly for enclosing the cable passing between the raceway and a point outside the raceway. A raceway cover is carried by the transition assembly cover for covering a top opening of the raceway defined by the side wall and a second, laterally spaced-apart side wall.

17 Claims, 15 Drawing Sheets

FIBER OPTIC CABLE RACEWAY OUTLET WITH RACEWAY COVER, AND METHOD

TECHNICAL FIELD AND BACKGROUND OF THE INVENTION

This application is based on and claims priority from a provisional application filed on Jan. 12, 2001, Ser. No. 60/261,563.

This invention relates to a cable raceway outlet which includes a cover for protecting the cable in the raceway proximate the raceway outlet. Such outlets are essential in the proper design and operation of fiber optic cable telecommunication systems. Fiber optic cable management often requires that fiber optic cables be routed between fiber optic distribution equipment and, for example, fiber optic line terminating equipment in buildings and other structures. Fiber optic cables are susceptible to damage if bent or crimped beyond a certain point. Standards have evolved which govern the degree of bend radius permitted in fiber optic cables of specified sizes.

Fiber optic cables are thus routed along raceways which are designed to protect the cable from damage while permitting access for modification, maintenance, connection and repair. These raceways are typically top-opening plastic troughs similar in configuration to rain gutters into which the cables are placed and along which the cables run from point-to-point. Fiber optic cables generally exit the raceway over one of the side walls and thus provision must be made to guide and support the cable to prevent damage from bending or crimping at this point of exit. Of course, the raceway outlet can also be used with other cable types, such as copper.

This invention provides a simple and inexpensive means of providing an outlet for such cables over the side of the raceway without any modification to the raceway itself. The outlet according to the invention is easily moveable, adaptable to many different raceway sizes and configurations, and provides all necessary support and bend restrictionli open top, while permitting easy access to the raceway when laying new cable or removing or repairing existing cable.

SUMMARY OF THE INVENTION

Therefore, it is an object of the invention to provide a cable raceway outlet which can be easily installed on a wide variety of raceway sizes and configurations.

It is another object of the invention to provide a cable raceway outlet which is easily movable to different locations on the raceway.

It is another object of the invention to provide a cable raceway outlet which requires no tools or other equipment form installation or movement.

It is another object of the invention to provide a cable raceway outlet which protects the raceway opening at the point of attachment by means of a moveable cover.

It is another object of the invention to provide a cable raceway outlet which permits easy access to the raceway when necessary.

It is another object of the invention to provide a cable raceway outlet which protects fiber optic cable from damage by supporting the cable and restricting the bend radius of the cable when exiting or entering a fiber optic cable raceway.

It is another object of the invention to provide a cable raceway outlet which is useable with cable raceways made by various raceway manufacturers.

These and other objects of the present invention are achieved in the preferred embodiments disclosed below by providing a cable raceway outlet mountable to a cable raceway having a side wall terminating in a top edge. The raceway outlet comprises a transition assembly for being mounted over the top of the top edge of the raceway for supporting a cable passing between the raceway and appoint outside the raceway, and a protective transition assembly cover for being positioned onto the transition assembly for enclosing the cable passing between the raceway and a point outside the raceway. A raceway cover is carried by the transition assembly cover for covering a top opening of the raceway defined by the side wall and a second, laterally spaced-apart side wall.

According to one preferred embodiment of the invention, a clamping member is carried by the transition assembly for contacting one of an inner or an outer surface of the side wall, and a latching member carried by the transition assembly for contacting another of the inner or outer surface of the side wall. The latching member is adapted for movement between a clamping position wherein the latching member and the clamping member are urged towards each other and against respective surfaces of the raceway sidewalls thereby clamping the side wall of the raceway between the latching member and the clamping member, and a release position wherein the latching member and the clamping member are spaced-apart from each other sufficiently to permit the transition assembly to be removed from, placed on or moved along the length of the raceway.

According to another preferred embodiment of the invention, the latching member comprises a pivot member extending along a length of the clamping member, and a cam mounted for pivotable movement on the pivot member between the clamping position wherein the cam is pivoted into an extended position against the sidewall of the raceway and the release position wherein the cam is pivoted into a retracted position in space-apart relation to the side wall of the raceway.

According to yet another preferred embodiment of the invention, the transition assembly includes at least one curved cable support wall for being positioned above the top edge of the raceway.

According to yet another preferred embodiment of the invention, the transition assembly includes first and second curved cable support walls for being positioned above the top edge of the raceway, the first curved wall defined by a radius perpendicular to a longitudinal dimension of the cable raceway, and the second curved wall defined by a radius parallel to the longitudinal dimension of the cable raceway.

According to yet another preferred embodiment of the invention, an enlarged void is defined by a wall of the transition assembly, the latching assembly and the clamping assembly for accommodating the top edge of cable raceways having an enlarged lip extending along the length of the top edge.

According to yet another preferred embodiment of the invention, the transition assembly includes a plurality of parallel walls defining individual exit paths for individual cables or cable groups.

According to yet another preferred embodiment of the invention, a cable raceway outlet mountable to a cable raceway having a side wall terminating in a top edge. The raceway outlet comprises a transition assembly for being mounted over the top of the top edge of the raceway for supporting a cable passing between the raceway and a point outside the raceway. A clamping member is carried by the transition assembly for contacting one of an inner or an outer surface of the side wall, and a latching member is carried by the transition assembly for contacting another of the inner or outer surface of the side wall. The latching member is adapted for movement between a clamping position wherein the latching member and the clamping member are urged towards each other and against respective surfaces of the raceway sidewalls thereby clamping the side wall of the raceway between the latching member and the clamping member, and a release position wherein the latching member and the clamping member are spaced-apart from each other sufficiently to permit the transition assembly to be removed from, placed on or moved along the length of the raceway. A protective transition assembly cover is provided for being positioned onto the transition assembly for enclosing the cable passing between the raceway and a point outside the raceway. A raceway cover is carried by the transition assembly cover for covering a top opening of the raceway defined by the side wall and a second, laterally spaced-apart side wall.

According to yet another preferred embodiment of the invention, the raceway cover is pivotally-mounted for movement between an open position allowing access to the raceway and a closed position covering the top opening of the raceway.

According to yet another preferred embodiment of the invention, the first and second curved cable support walls are integrally-formed and include an intermediate cable support wall providing a gradual curved transition between the first and second cable support walls.

An embodiment of the method of exiting a cable from a cable raceway according to the invention comprises the steps of providing an raceway outlet including a transition assembly for being mounted over the top of the top edge of the raceway for supporting a cable passing between the raceway and a point outside the raceway. A raceway cover is moveable between an open position allowing access to the raceway and a closed position covering an open top of the raceway. The transition assembly is placed onto the top edge of the cable raceway without any alteration to the raceway sidewall and top edge thereof, and the position of the transition assembly is adjusted to the correct position to exit the cable at the correct position. The raceway cover is moved between the open position allowing access to the raceway and a closed position covering an open top of the raceway as needed to place or remove cable from the raceway.

According to one preferred embodiment of the invention, the method includes the step of removing at least one cable from the raceway and passing it from raceway through the transition assembly of the cable raceway outlet.

According to another preferred embodiment of the invention, the method includes the step of moving the transition assembly to a new position relative to the raceway.

According to yet another preferred embodiment of the invention, the step of moving the raceway outlet to a new position includes the step of sliding the transition assembly along the top edge of the raceway without removing it from the top edge of the raceway.

According to yet another preferred embodiment of the invention, the method includes the step of placing a transition assembly cover onto the transition assembly for protecting the cable therein.

According to yet another preferred embodiment of the invention, the method includes the steps of providing a raceway cover carried by the transition assembly cover, moving the raceway cover into a closed position for covering a top opening of the raceway, and moving the raceway cover into an open position for exposing the top opening of the raceway.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
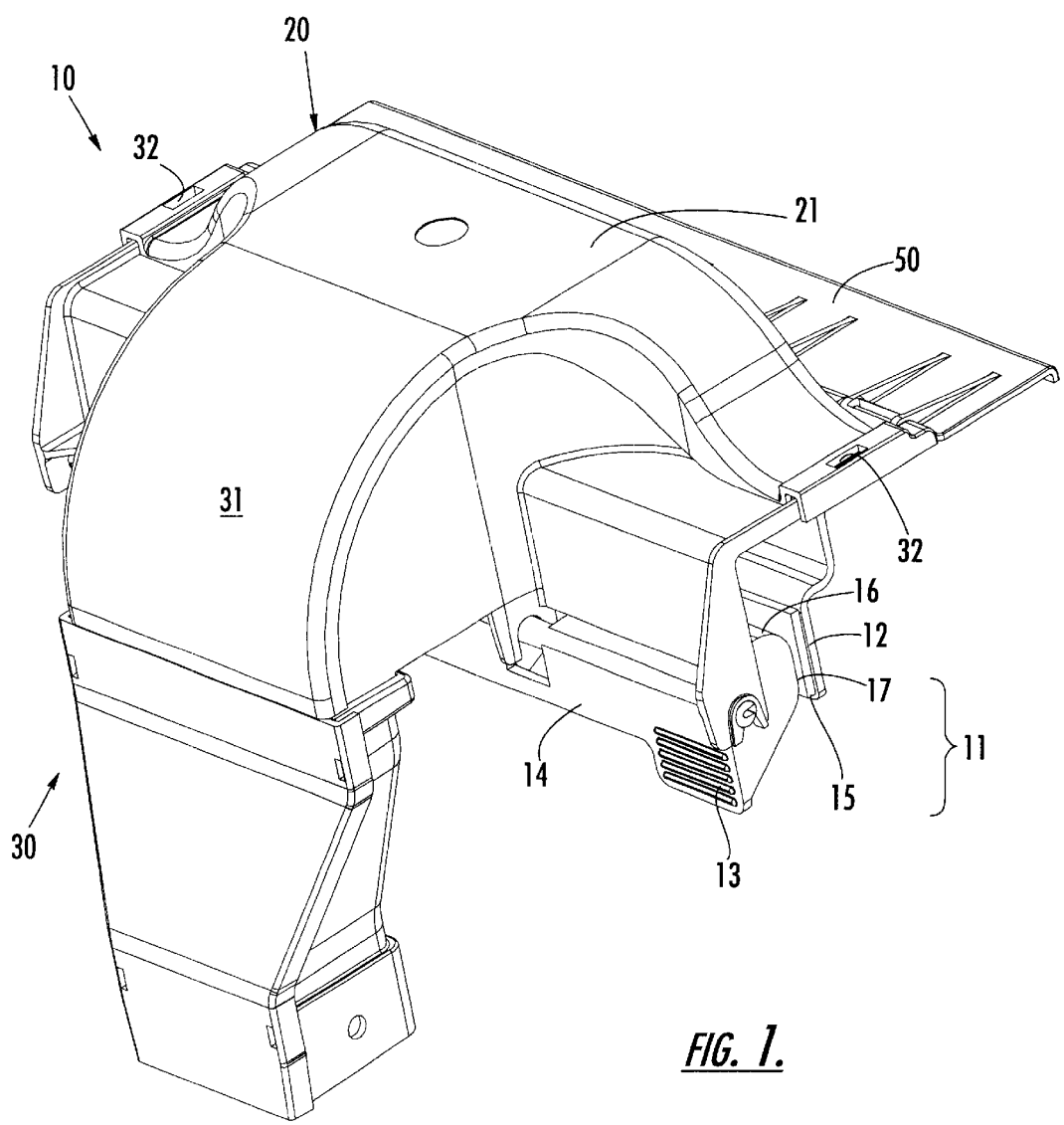
FIG. 1 is a perspective view of a cable raceway outlet according to one embodiment of the invention.
Figure 2:
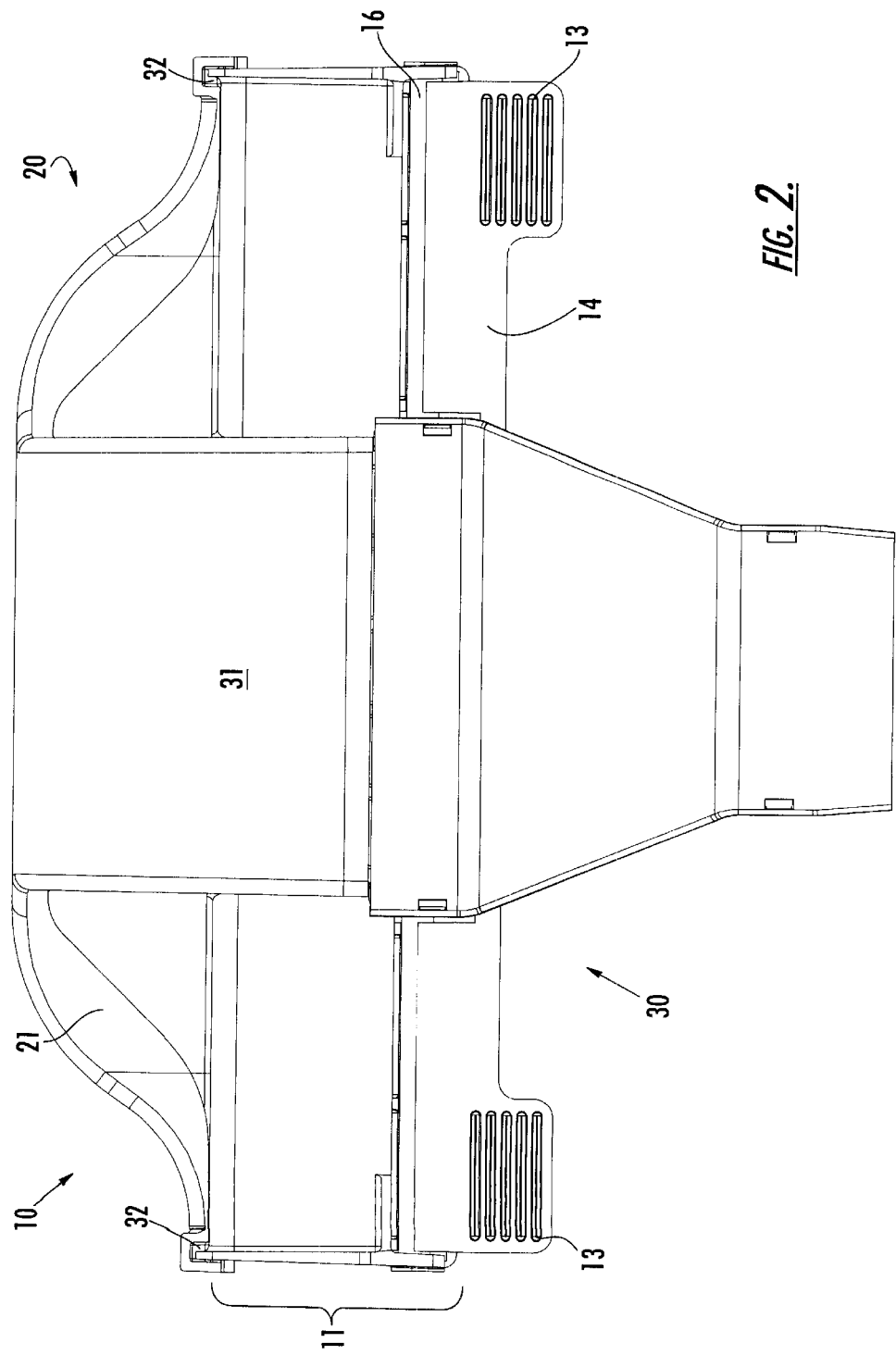
FIG. 2 is a front elevation of the cable raceway outlet shown in FIG. 1.
Figure 3:
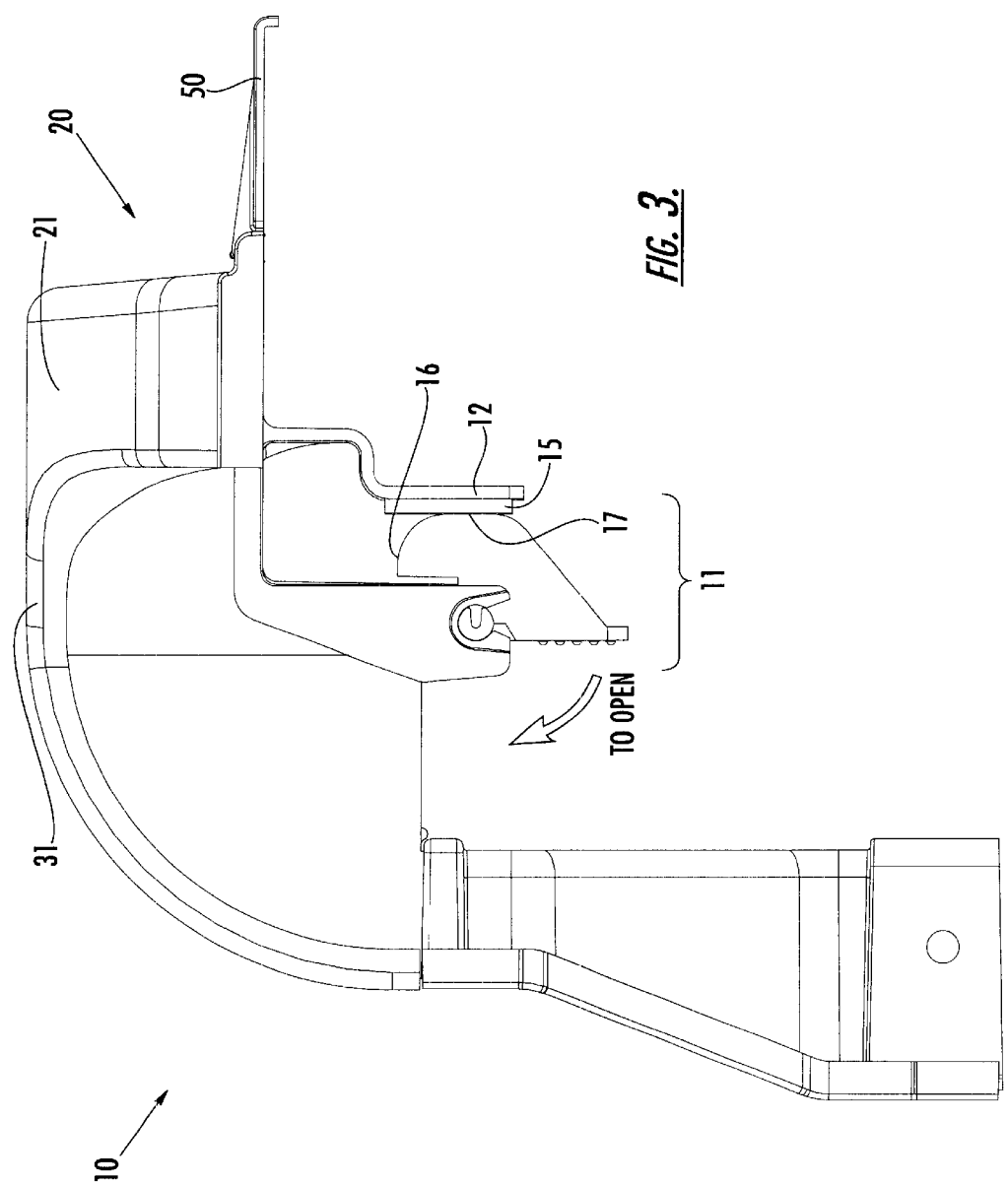
FIG. 3 is a side elevation of the cable raceway outlet shown in FIG. 1.
Figure 4:
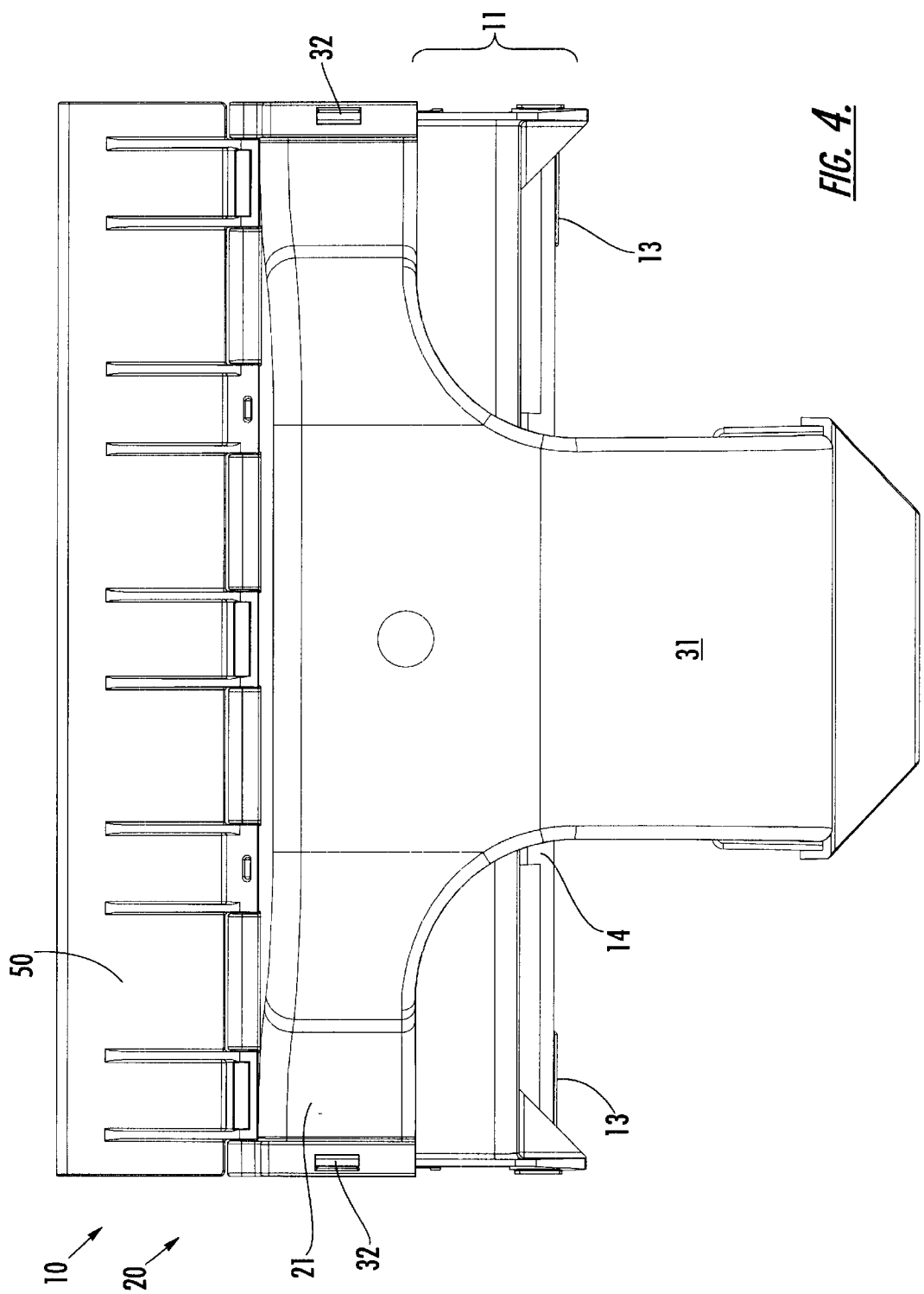
FIG. 4 top plan view of the cable raceway outlet shown in FIG. 1.
Figure 5:
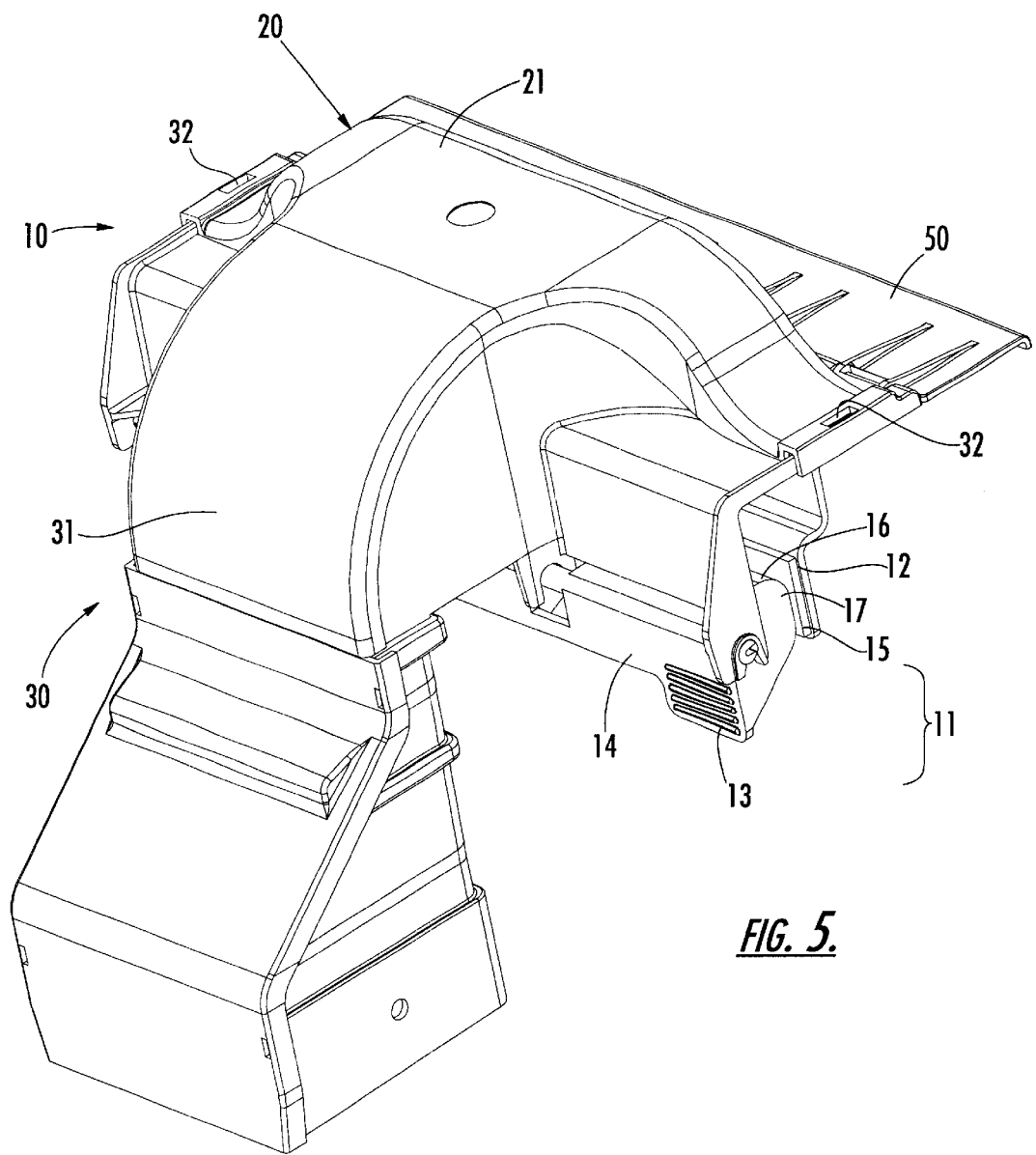
FIG. 5 is a perspective view of another embodiment of the cable raceway outlet according to the invention.
Figure 6:
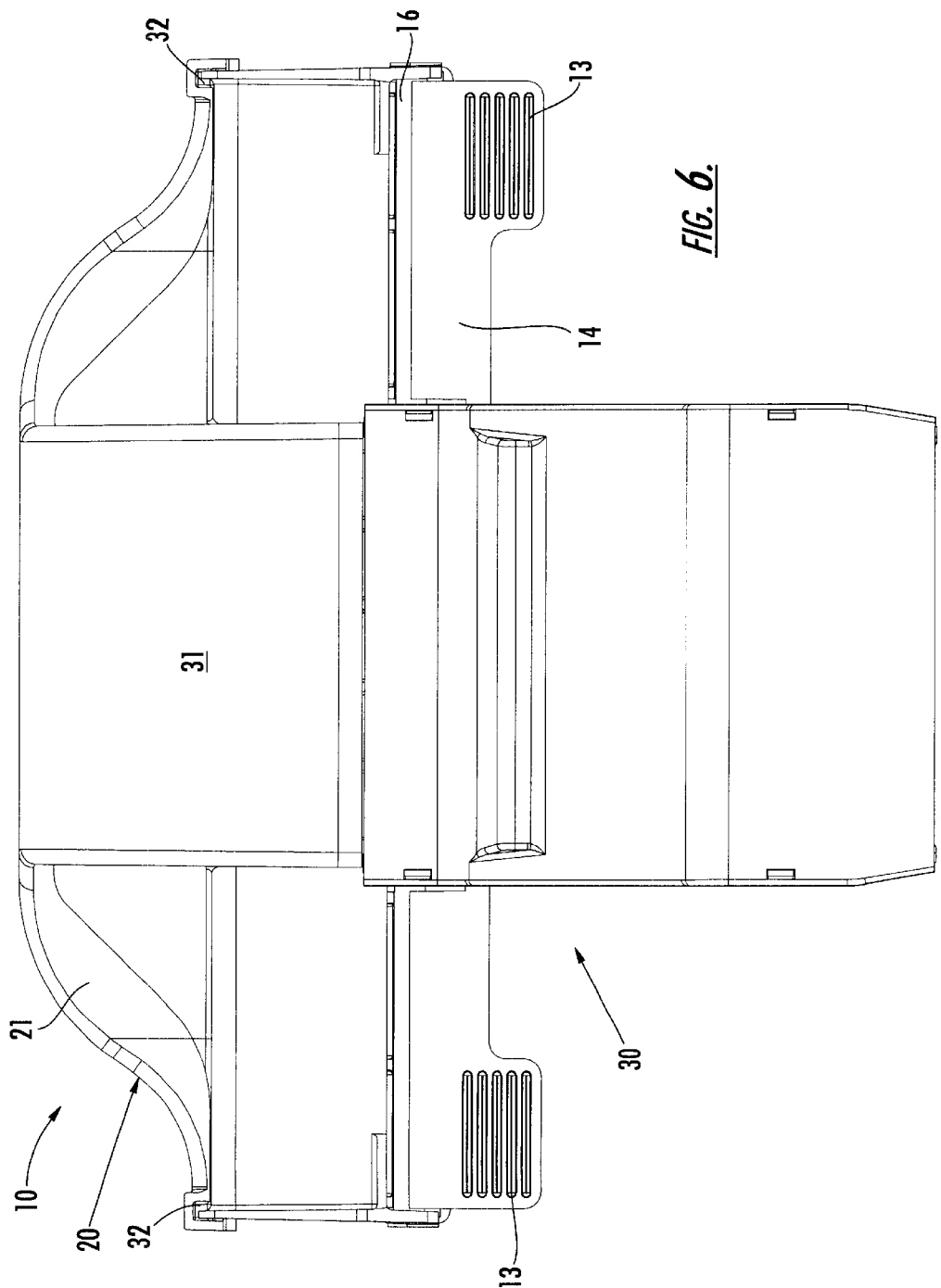
FIG. 6 is a front elevation of the cable raceway outlet shown in FIG. 5.
Figure 7:
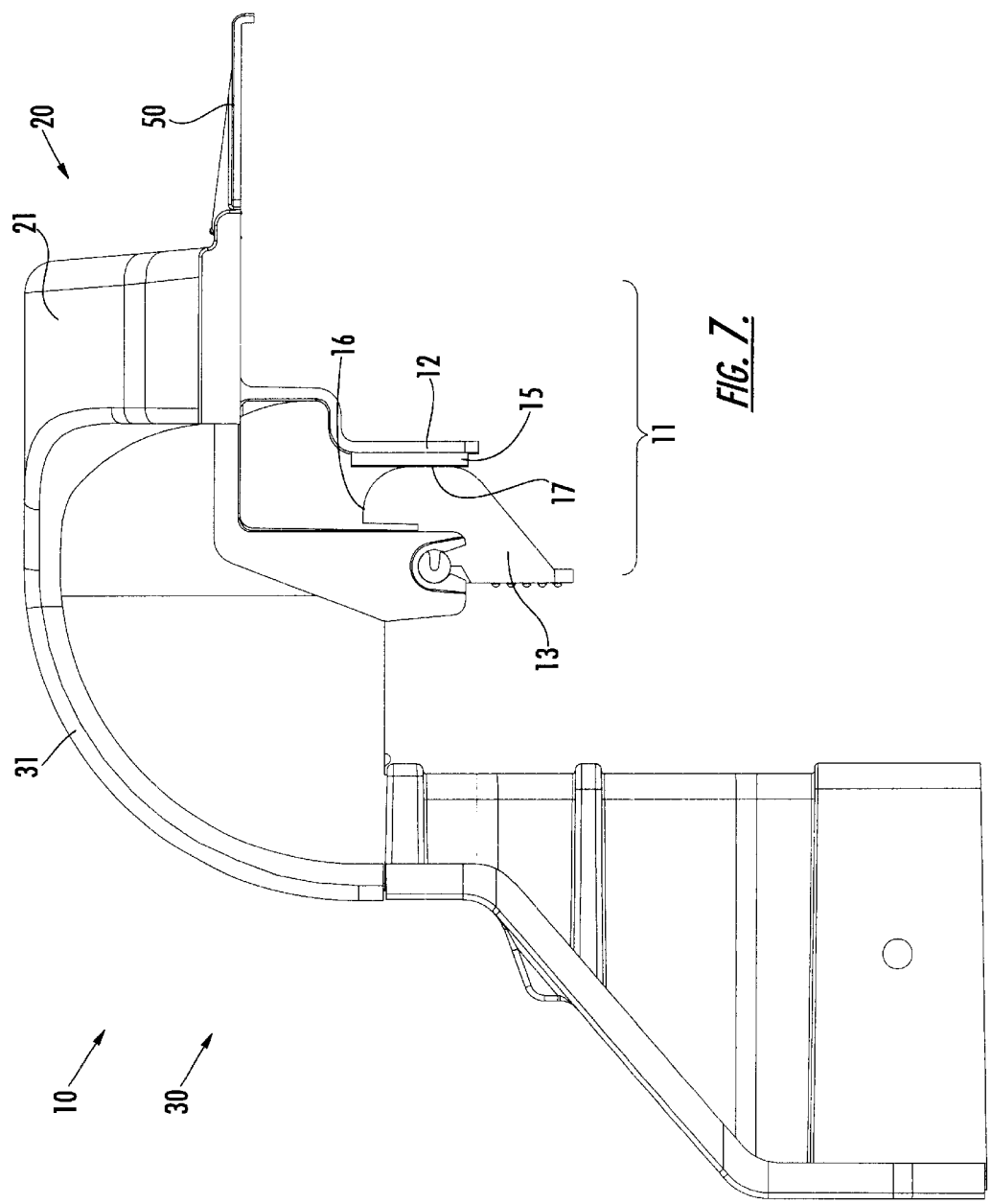
FIG. 7 is a side elevation of the cable raceway outlet shown in FIG. 5.
Figure 8:
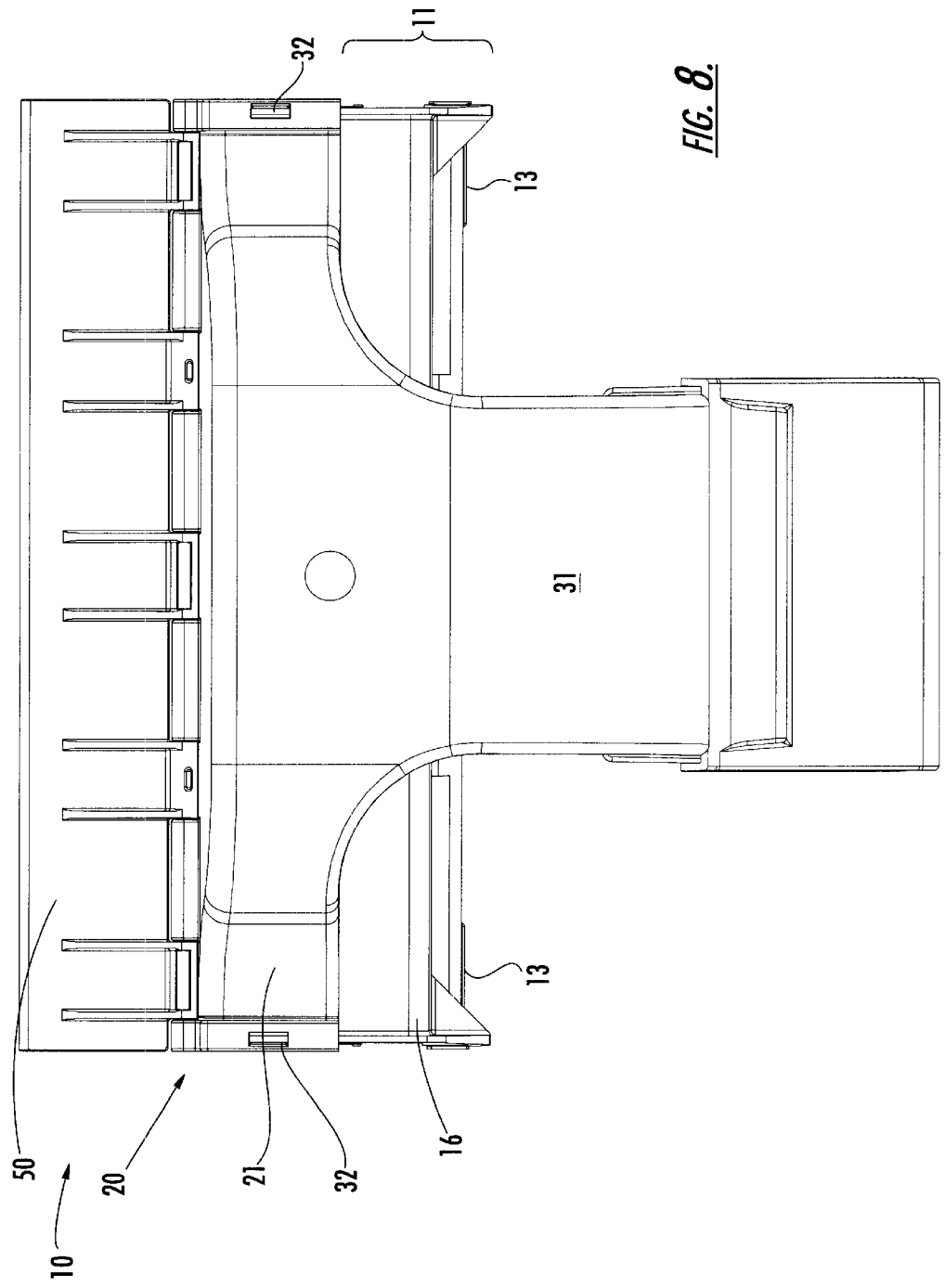
FIG. 8 is a top plan view of the cable raceway outlet shown in FIG. 5.
Figure 9:
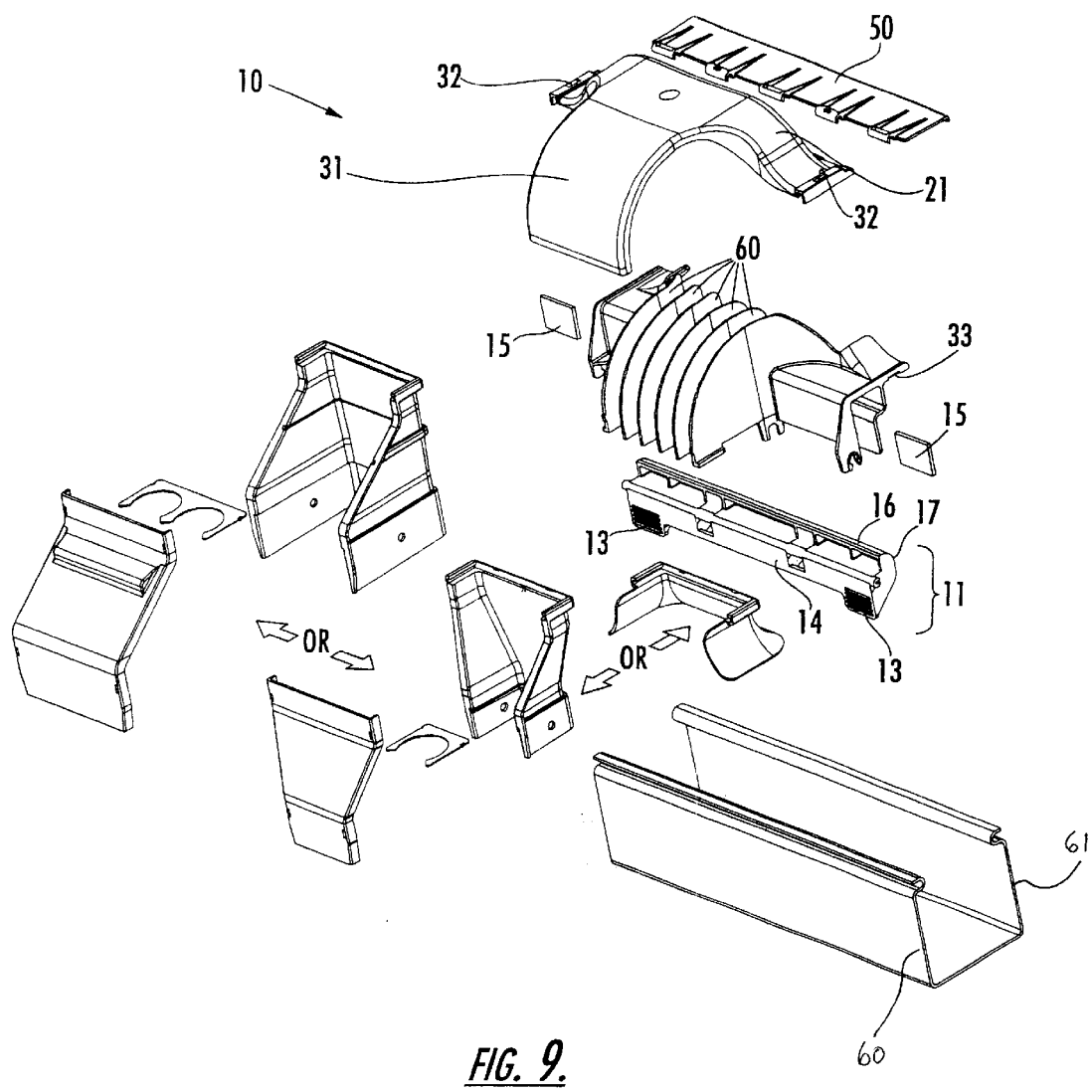
FIG. 9 is an exploded view of the cable raceway outlet shown in FIG. 5 together with a length of raceway.
Figure 10:
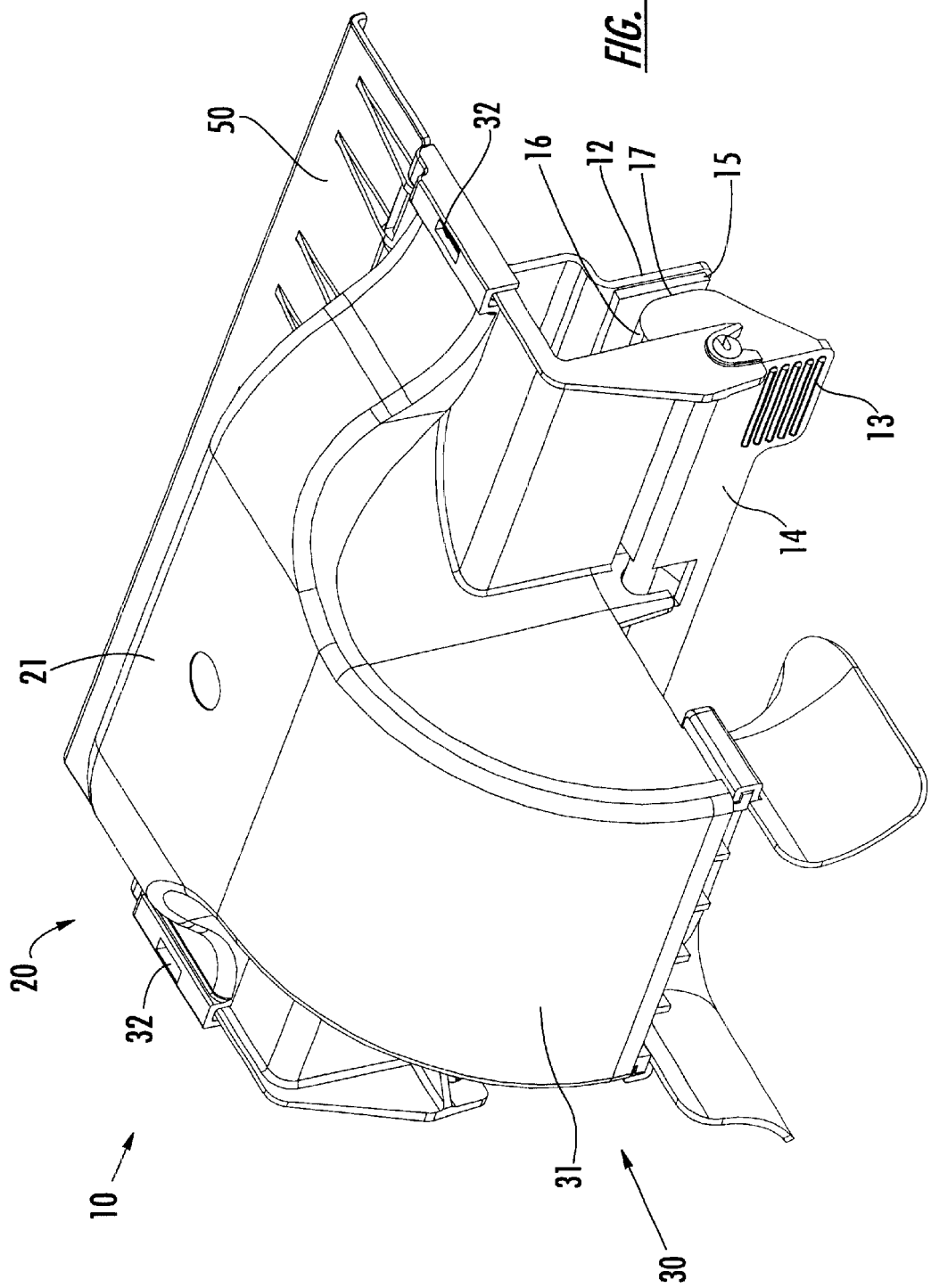
FIG. 10 is a perspective view of another embodiment of the invention.
Figure 11:
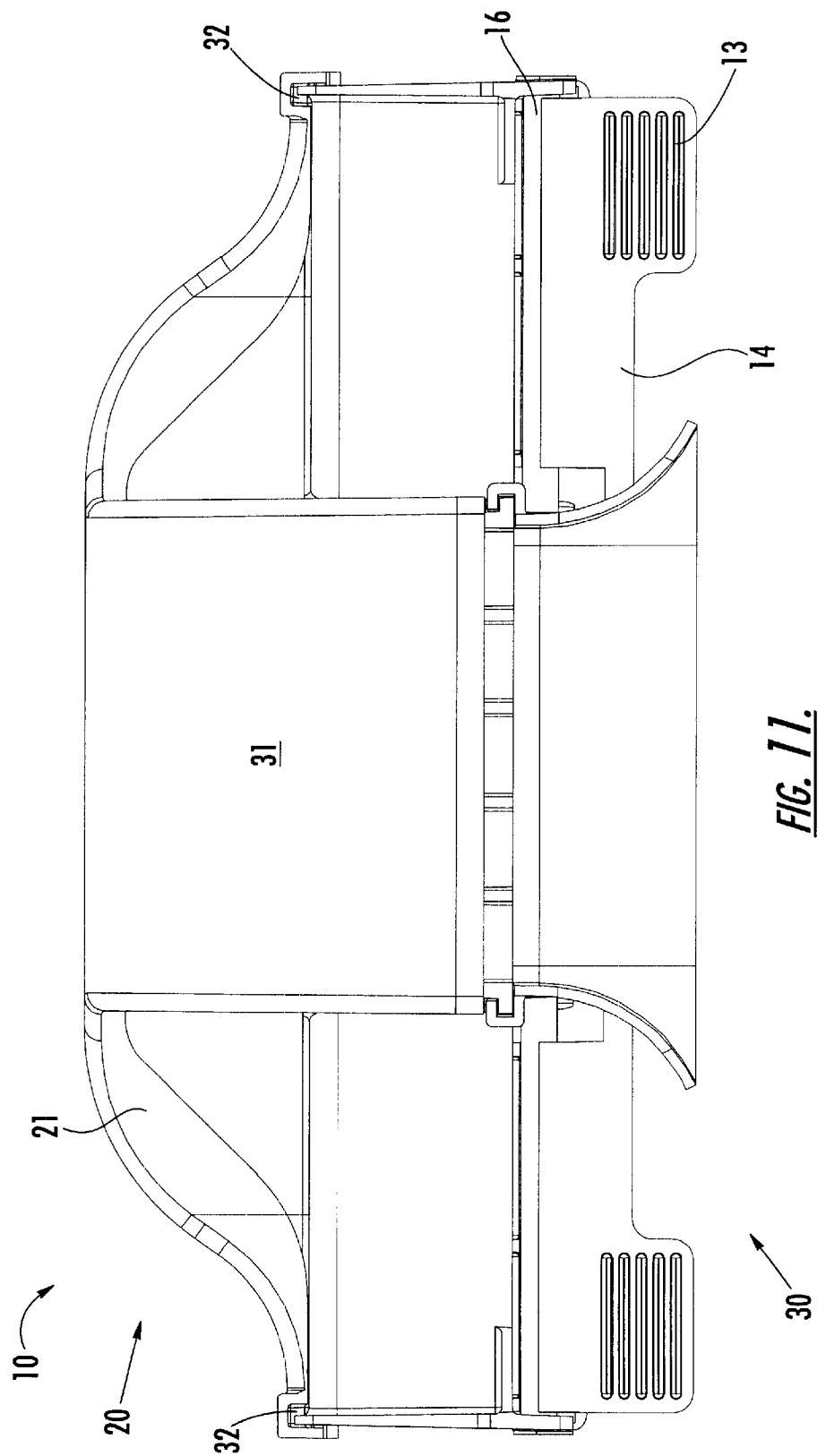
FIG. 11 is a front elevation of the cable raceway outlet shown in FIG. 10.
Figure 12:
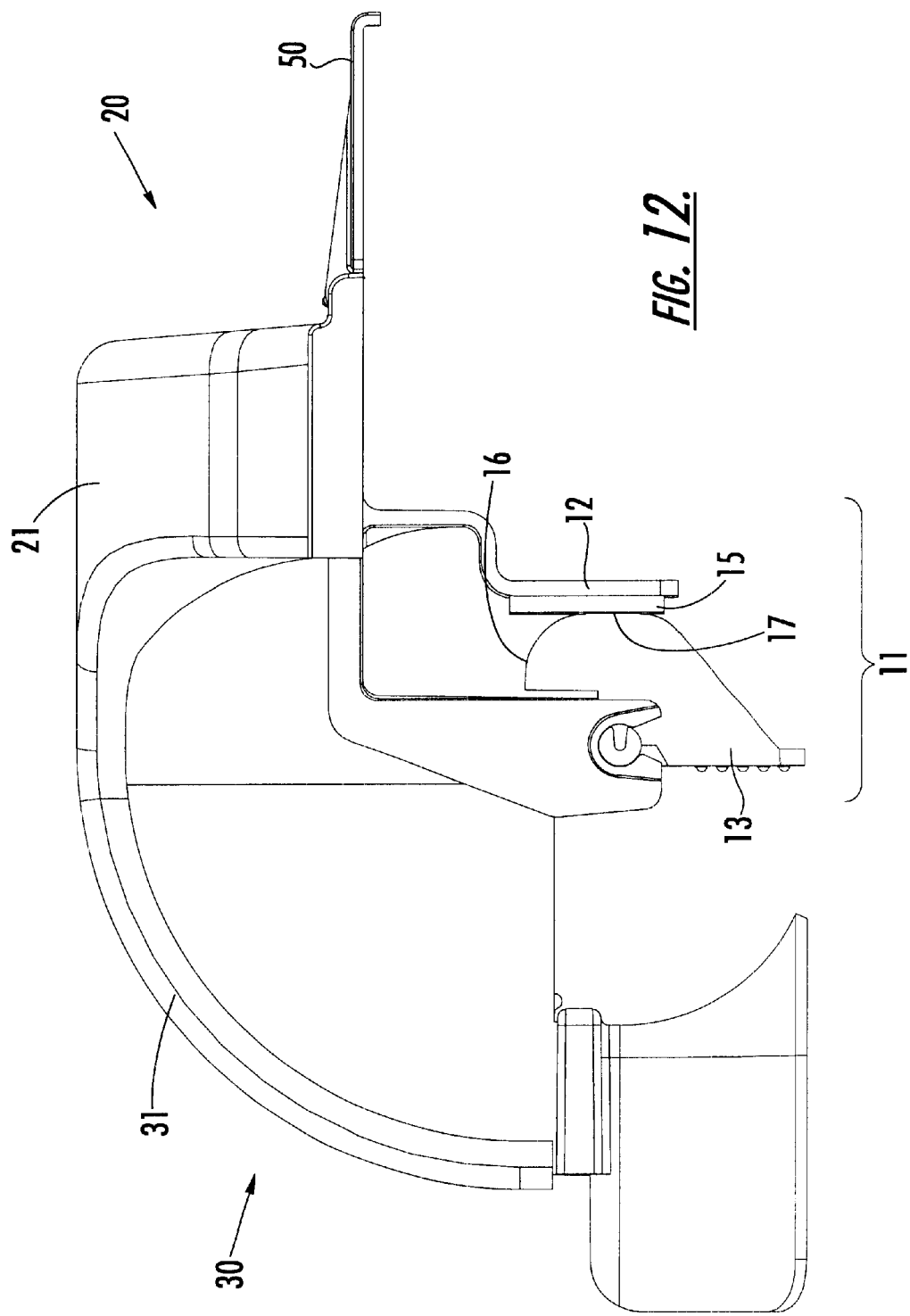
FIG. 12 is a side elevation of the cable raceway outlet shown in the FIG. 10.

Referring now specifically to the drawings, a cable raceway outlet according to several closely related embodiments of the present invention is illustrated in FIGS. 1–15 and shown generally at reference numeral 10. The cable raceway outlet 10 is designed to sit on top of and straddle one side wall of a cable raceway. The cable raceway outlet 10 may be made in any size to accommodate different size raceways. Two typical-sized raceways with which the cable raceway outlet 10 is useable are two-inch by two-inch and four-inch by four-inch raceways. In general, the cable raceway outlet 10 is symmetrical side-to-side, so that reference to a pair of elements on opposite ends of the cable raceway outlet 10 is understood as referring to identical elements unless otherwise stated.

The cable raceway outlet 10 is constructed of molded, high-impact plastic which conforms to industry standards. Cable raceway outlet 10 includes a bracket assembly 11 by which it is attached to a raceway. See FIGS. 9 and 13. Bracket assembly 11 includes a pair of clamping members 12 on opposite ends of the cable raceway outlet 10 which cooperate with latching members 13 integrally formed on a pivotable latch arm 14 which extends the length of the cable raceway outlet 10. A pair of pads 15 carried on respective clamping members 12 provide improved adherence to the raceway and additional resilience during and after latching.

The latching members 13 have a curved face 16 which acts as a cam and bears against and moves along the outer sidewall of the raceway until it moves past an over center point, where it snaps into position with a flat face 17 flush in a latched position against the outer side wall with the outer sidewall pinched between the latching members 13 and the clamping members 12. This requires no tools and no alteration to the raceway. Precise adjustment and readjustment is possible merely by releasing the latching members 13 by pulling upwardly on the latching members 13 and thereby forcing the curved face 16 downwardly along the outer side wall of the raceway until it reaches a release position with the latching members 13 in an approximate 90 degree position to the position shown in FIG. 13. In this position the cable raceway outlet 10 is removable by lifting it off of the raceway, or laterally adjustable by sliding it along the raceway to the desired position. This is particularly useful feature, since it allows initial placement in the approximately correct position, and subsequent adjustment to the exact position. Since no cutting or other alteration of the raceway is necessary, adjustments of any degree can be made whenever needed.

Figure 15:
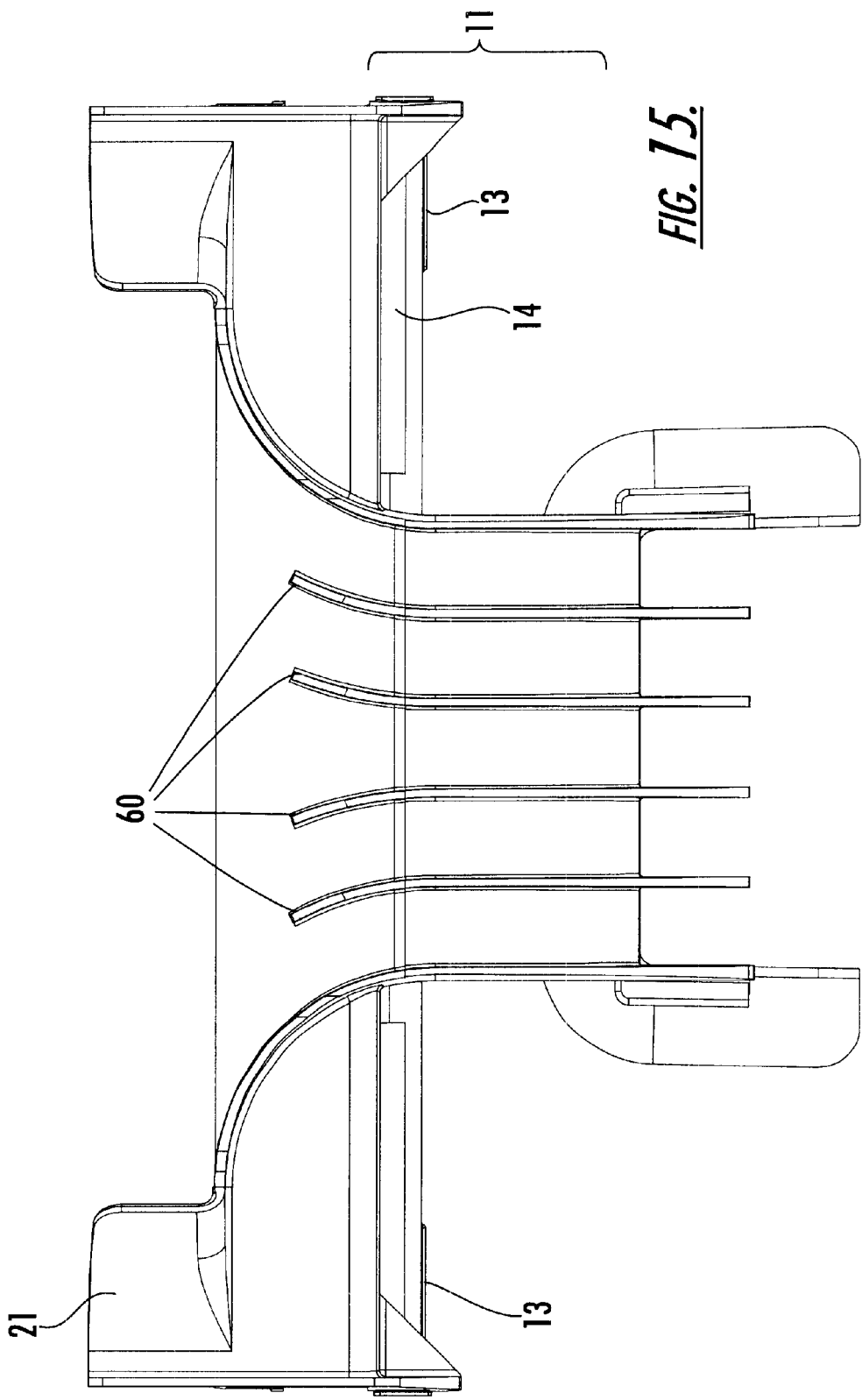
FIG. 15 is a top plan view of the cable raceway outlet shown in FIG. 10, with the cover removed.

An outlet transition assembly 20 is carried on the bracket assembly 11 and includes a pair of transition flanges 21 which guide the fiber optic cable out of the raceway from either direction without excessive bending. The transition flanges 21 guide the cables around a 90 degree bend into a down spout 30 which is normally inclosed by a cover 31 and includes several divider walls 60 for maintaining separation between individual cables. These divider walls are shown in FIG. 15, where the down spout 30 is shown with the cover 31 removed. The down spout 30 can be mated with several different types of fittings for attachment to vertical raceways, terminations or the like. Compare FIGS. 1–4, 5–8, 10–15. See also FIG. 9 (all embodiments in FIGS. 1–4, 5–8 and 10–15 alternatively shown).

The cover 31 latches to the down spout 30 by means of a pair of tabs 32 on the underside of cover 31 which interlock with a respective pair of notches 33 formed in the underside of opposite ends of the transition flange 21. See FIG. 9.

Figure 13:
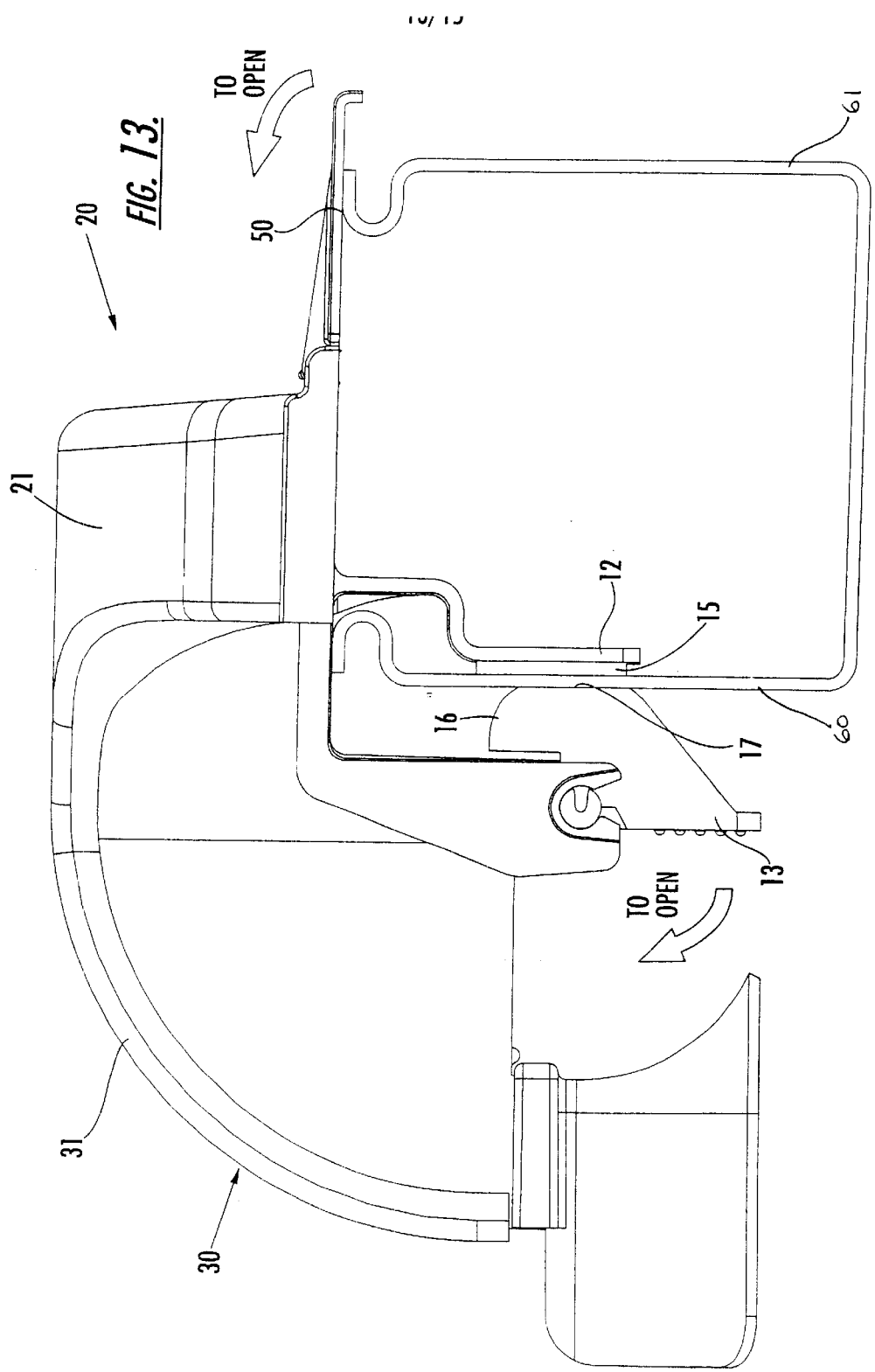
FIG. 13 is a side elevation of the cable raceway outlet shown in the FIG. 10 in place on a raceway.
Figure 14:
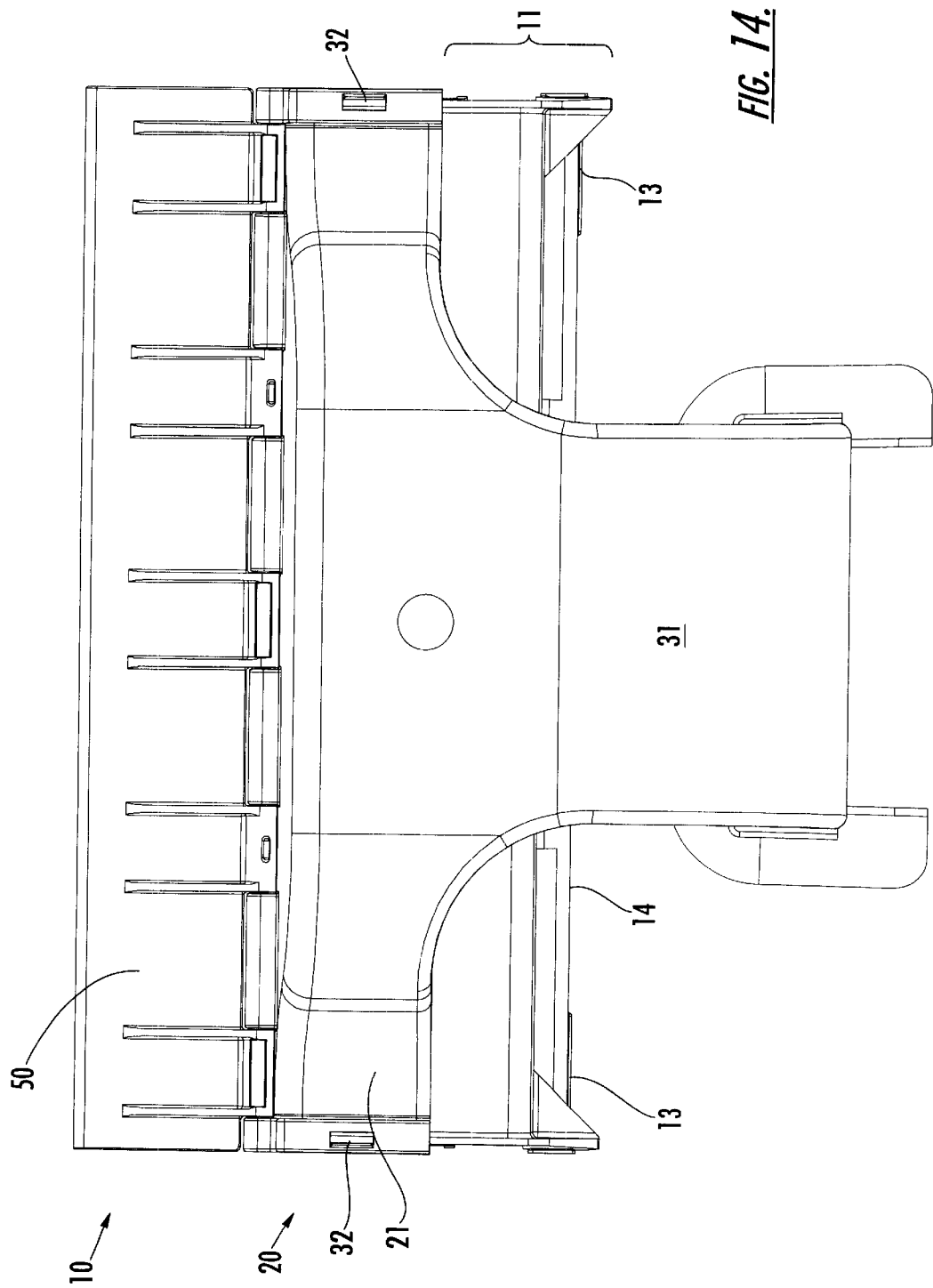
FIG. 14 is a top plan view of the cable raceway outlet shown in FIG. 10.

Cable raceway outlet 10 also includes a hinged raceway cover 50 which is movable between a closed, horizontal position shown in FIG. 13 where it overlaps the top of and encloses the top of the raceway, and on open position with the raceway cover in a vertical position. In the open position, the raceway cover 50 exposes approximately one-third of the top opening of the raceway, and permits an installer to drop additional cable into the raceway without removing the cable raceway outlet 10.

As is apparent from the foregoing, the cable raceway outlet 10 can easily be attached to a raceway having a side wall 60 and second laterally spaced-apart sidewall 61 by placing the raceway outlet over the side wall 60 with the clamping members 12 on the inside of the side wall 60 and the latching members 13 on the outside in the open position. See FIG. 13. With the top edge of the raceway side wall 60 against the top of the bracket assembly 11 (FIG. 13), the latching members 13 are moved to the position shown in FIGS. 3 and 13.

A cable raceway outlet is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A cable raceway outlet mountable to a cable raceway having a first side wall terminating in a top edge, said raceway outlet comprising:
   (a) a transition assembly for being mounted over the top of the top edge of the raceway for supporting a cable passing between the raceway and a point outside the raceway;
   (b) a protective transition assembly cover for being positioned onto the transition assembly for enclosing the cable passing between the raceway and a point outside the raceway; and
   (c) a raceway cover carried by the transition assembly cover for covering a top opening of the raceway defined by the first side wall and a second, laterally spaced-apart side wall.

2. A cable raceway outlet according to claim 1, and including:
   (a) a clamping member carried by the transition assembly for contacting one of an inner or an outer surface of the first side wall;
   (b) a latching member carried by the transition assembly for contacting another of the inner or outer surface of the first side wall, said latching member adapted for movement between:
      (i) a clamping position wherein said latching member and said clamping member are urged towards each other and against respective surfaces of the first side wall thereby clamping the first side wall between the latching member and the clamping member;
      (ii) a release position wherein said latching member and said clamping member are spaced-apart from each other sufficiently to permit the transition assembly to be removed from, placed on or moved along a length of the raceway.

3. A cable raceway outlet according to claim 2, wherein said latching member comprises:
   (a) a pivot member extending along a length of the clamping member; and
   (b) a cam mounted for pivotable movement on the pivot member between the clamping position wherein the cam is pivoted into an extended position against the first side wall and the release position wherein the cam is pivoted into a retracted position in space-apart relation to the first side wall.

4. A cable raceway outlet according to claim 3, wherein said transition assembly includes at least one curved cable support wall for being positioned above the top edge of the raceway.

5. A cable raceway outlet according to claim 2, and including an enlarged void defined by a wall of the transition assembly, the latching assembly and the clamping assembly for accommodating the top edge of the first side wall.

6. A cable raceway outlet according to claim 1, wherein said transition assembly includes first and second curved cable support walls for being positioned above the top edge of the raceway, said first curved wall defined by a radius perpendicular to a longitudinal dimension of the cable raceway, and said second curved wall defined by a radius parallel to the longitudinal dimension of the cable raceway.

7. A cable raceway outlet according to claim 6, wherein said first and second curved cable support walls are integrally-formed and include an intermediate cable support wall providing a gradual curved transition between the first and second curved cable support walls.

8. A cable raceway outlet according to claim 1, wherein said transition assembly includes a plurality of parallel walls defining individual exit paths for individual cables or cable groups.

9. A cable raceway outlet mountable to a cable raceway having a side wall terminating in a top edge, said raceway outlet comprising:

(a) a transition assembly for being mounted over the top of the top edge of the raceway for supporting a cable passing between the raceway and a point outside the raceway;

(b) a clamping member carried by the transition assembly for contacting one of an inner or an outer surface of the side wall;

(c) a latching member carried by the transition assembly for contacting another of the inner or outer surface of the side wall, said latching member adapted for movement between:

(i) a clamping position wherein said latching member and said clamping member are urged towards each other and against respective surfaces of the raceway sidewalls thereby clamping the side wall of the raceway between the latching member and the clamping member;

(ii) a release position wherein said latching member and said clamping member are spaced-apart from each other sufficiently to permit the transition assembly to be removed from, placed on or moved along a length of the raceway; and (d) a protective transition assembly cover for being positioned onto the transition assembly for enclosing the cable passing between the raceway and a point outside the raceway; and (e) a raceway cover carried by the transition assembly cover for covering a top opening of the raceway defined by the side wall and a second, laterally spaced-apart side wall.

10. A cable raceway outlet according to claim 9, wherein said raceway cover is pivotally-mounted for movement between an open position allowing access to the raceway and a closed position covering the top opening of the raceway.

11. A method of exiting a cable from a cable raceway, and comprising the steps of:

(a) providing an raceway outlet including a transition assembly for being mounted over the top of a top edge of the raceway for supporting a cable passing between the raceway and a point outside the raceway, and including a raceway cover moveable between an open position allowing access to the raceway and a closed position covering an open top of the raceway;

(b) placing the transition assembly onto the top edge of the cable raceway without any alteration to a raceway sidewall and top edge thereof;

(c) adjusting the position of the transition assembly to the correct position to exit the cable at the correct position;

(d) moving the raceway cover between the open position allowing access to the raceway and a closed position covering an open top of the raceway as needed to place or remove cable from the raceway; and (e) moving the raceway outlet to a new position relative to the raceway as needed by sliding the transition assembly along the top edge of the raceway without removing the transition assembly from the top edge of the raceway.

12. A method according to claim 11, and including the step of removing at least. one cable from the raceway and passing it from raceway through the transition assembly of the cable raceway outlet.

13. A method according to claim 11, and including the step of placing a transition assembly cover onto the transition assembly for protecting the cable therein.

14. A method according to claim 13, and including the steps of:

(a) providing a raceway cover carried by the transition assembly cover;

(b) moving the raceway cover into a closed position for covering a top opening of the raceway; and (c) moving the raceway cover into an open position for exposing the top opening of the raceway.

15. A method of exiting a cable from a cable raceway, and comprising the steps of:

(a) providing an raceway outlet including a transition assembly for being mounted over the top of a top edge of the raceway for supporting a cable passing between the raceway and a point outside the raceway, and including a raceway cover moveable between an open position allowing access to the raceway and a closed position covering an open top of the raceway;

(b) placing the transition assembly onto the top edge of the cable raceway without any alteration to a raceway sidewall and top edge thereof;

(c) adjusting the position of the transition assembly to the correct position to exit the cable at the correct position;

(d) moving the raceway cover between the open position allowing access to the raceway and a closed position covering an open top of the raceway as needed to place or remove cable from the raceway;

(e) placing a transition assembly cover onto the transition assembly for protecting the cable therein;

(f) providing a raceway cover carried by the transition assembly cover;

(g) moving the raceway cover into a closed position for covering a top opening of the raceway; and (h) moving the raceway cover into an open position for exposing the top opening of the raceway.

16. A method according to claim 15, and including the step of moving the raceway outlet to a new position relative to the raceway.

17. A method according to claim 16, wherein the step of moving the raceway outlet to a new position includes the step of sliding the transition assembly along the top edge of the raceway without removing it from the top edge of the raceway.

* * * * *